United States Patent
Machynak et al.

(10) Patent No.: US 11,052,724 B2
(45) Date of Patent: Jul. 6, 2021

(54) AIR CONDITIONING FITTING WITH AXIAL AND RADIAL ELASTOMERIC SEALING ELEMENT AND METAL TO METAL TAPER SADDLE

(71) Applicant: Hanon Systems, Daejeon (KR)

(72) Inventors: Augustin Machynak, Senov u Noveho Jicina (CZ); Radek Macicek, Senov u Noveho Jicina (CZ)

(73) Assignee: HANON SYSTEMS, Daejeon (KR)

( * ) Notice: Subject to any disclaimer, the term of this patent is extended or adjusted under 35 U.S.C. 154(b) by 186 days.

(21) Appl. No.: 16/352,970

(22) Filed: Mar. 14, 2019

(65) Prior Publication Data

US 2020/0001683 A1 Jan. 2, 2020

Related U.S. Application Data

(60) Provisional application No. 62/691,052, filed on Jun. 28, 2018.

(51) Int. Cl.
*F16L 21/00* (2006.01)
*F16L 23/16* (2006.01)
(Continued)

(52) U.S. Cl.
CPC ....... *B60H 1/00571* (2013.01); *B60H 1/3229* (2013.01); *F16L 21/007* (2013.01); *F16L 19/0218* (2013.01); *F16L 23/02* (2013.01); *F16L 23/032* (2013.01); *F16L 23/16* (2013.01); *F16L 23/18* (2013.01)

(58) Field of Classification Search
CPC ....... F16L 21/007; F16L 23/032; F16L 23/16; F16L 19/0218; F16L 23/02; F16L 23/18; B60H 1/3229
See application file for complete search history.

(56) References Cited

U.S. PATENT DOCUMENTS

| 4,452,474 A | * | 6/1984 | Hagner | F16L 23/18 285/334.1 |
| 6,676,167 B2 | * | 1/2004 | Schroeder | B60H 1/00571 285/124.4 |

(Continued)

FOREIGN PATENT DOCUMENTS

| CN | 102797920 A | 11/2012 |
| DE | 102006029645 A1 | 1/2008 |

(Continued)

*Primary Examiner* — Frantz F Jules
*Assistant Examiner* — Lionel Nouketcha
(74) *Attorney, Agent, or Firm* — Shumaker, Loop & Kendrick, LLP; James D. Miller

(57) ABSTRACT

A block fitting and seal structure for an air conditioning system includes a male block fitting and a female block fitting. The male block fitting includes an axially extending protuberant portion. A distal end of the protuberant portion has a tapered portion formed thereon. A female block fitting includes a recessed portion with a tapered portion formed therein. The tapered portion of the female block fitting is configured to engage the tapered portion of the male block fitting. An annular seal is disposed between the male block fitting and the female block fitting. The seal provides an axial seal and a radial seal between the male block fitting and the female block fitting.

7 Claims, 5 Drawing Sheets

(51) Int. Cl.
    *F16L 23/032*     (2006.01)
    *F16L 23/18*     (2006.01)
    *B60H 1/00*     (2006.01)
    *B60H 1/32*     (2006.01)
    *F16L 23/02*     (2006.01)
    *F16L 19/02*     (2006.01)

(56) References Cited

U.S. PATENT DOCUMENTS

| | | | |
|---|---|---|---|
| 6,834,893 B2 * | 12/2004 | Schroeder | F16L 21/08 |
| | | | 285/124.5 |
| 7,032,934 B2 * | 4/2006 | Wosik | F16L 19/055 |
| | | | 285/332.2 |
| 7,621,568 B2 | 11/2009 | Schroeder et al. | |
| 9,261,194 B2 | 2/2016 | Kesler et al. | |
| 2015/0020371 A1 * | 1/2015 | Beagen, Jr. | F16L 13/14 |
| | | | 29/525.05 |
| 2015/0115603 A1 | 4/2015 | Trombley et al. | |
| 2018/0231166 A1 * | 8/2018 | Tom | F16L 19/0206 |

FOREIGN PATENT DOCUMENTS

| | | | |
|---|---|---|---|
| DE | 102007035222 A1 | | 1/2009 |
| JP | 2006283781 A | | 10/2006 |
| JP | 2007198549 A | * | 8/2007 |
| JP | 2007198549 A | | 8/2007 |
| JP | 2010031941 A | | 2/2010 |
| KR | 20100012175 u | | 12/2010 |
| KR | 200459475 Y1 | | 2/2012 |

\* cited by examiner

AIR CONDITIONING FITTING WITH AXIAL AND RADIAL ELASTOMERIC SEALING ELEMENT AND METAL TO METAL TAPER SADDLE

CROSS REFERENCE TO RELATED APPLICATIONS

This application claims the benefit of U.S. Provisional Application No. 62/691,052, filed on Jun. 28, 2018. The entire disclosure of the above application is hereby incorporated herein by reference.

FIELD OF THE INVENTION

The invention relates to a fitting for a vehicle air condition system and more particularly to a fitting for coupling tubing segments, the fitting including a seal structure axially and radially sealing the fitting.

BACKGROUND OF THE INVENTION

In assembly line manufacturing of vehicles, it is desirable that line fittings in an air conditioning system can be secured using a power nut driver rather than using a torque wrench. For this reason, peanut or block type fittings are often used.

Various refrigerants such as R12, R134a, R1234yf and R744 ($CO_2$) are used in the air conditioning system for the vehicle. However, environmental concerns exist. As a result, legislation was passed by various governmental agencies of the United States and the European Union, for example, requiring that the air conditioning system operate with substantially no refrigerant leaks or permeation.

Seal structures having multiple seals are used to militate against leaks from the fittings used in the air conditioning system. These prior art seal structures include rubber O-rings and other elastomeric seals, for example. However, over time, such seals can degrade. Damage to the seal structure can also occur due to improper installation or handling.

Prior art block fittings with seal structures are described in U.S. Pat. Nos. 7,621,568 and 9,261,194, the entire disclosures of which are hereby incorporated herein by reference. The block fittings typically include a male block portion with a first aperture receiving a tube end therein. The block fitting also includes a female block portion with a first aperture receiving a tube end therein or a female connection integrated into a mating component. The first aperture of the male block portion and the first aperture of the female block portion are substantially concentrically aligned.

Examples of a prior art block fitting and seal structure can be seen in FIG. 1. FIG. 1 shows a conventional block fitting and seal structure 10. The block fitting and seal structure 10 includes a male block fitting 12 and a female block fitting 14. First apertures 16, 18 of the male block fitting 12 and the female block fitting 14, respectively, receive an end of a tube therein to substantially axially align the tubes. A seal 20 is received between the male block fitting 12 and the female block 14 fitting to substantially surround and seal the apertures 16, 18 of the male block fitting 12 and the female block fitting 14. An indentation (not shown) formed in the female block fitting 14 receives a male protuberance 22 formed on the male block fitting 12 to facilitate alignment of the respective first apertures 16, 18. Thus, a refrigerant is conveyed through the tubes in a substantially leak free manner. Second apertures 24, 26 formed in the male block fitting 12 and the female block fitting 14, respectively, receive a fastener 28 therein to facilitate fastening the male block fitting 12 and the female block fitting 14 together.

However, the prior art block fitting and seal structures require use of larger fitting flanges (i.e. material or portions surrounding the first apertures and the second apertures of the male block fitting and the female block fitting) due to a larger torque required to tighten the fastener used to couple the male block fitting and the female block fitting together. The larger flanges prevent distortion or bending of the male block fitting or the female block fitting. The undesired larger torque is required due to the configuration and location of the seals between the male block fitting and the female block fitting. The larger fitting flanges result in undesirable added weight and larger package size.

There is a continuing need for a fitting including a seal structure for use in an air conditioning system which minimizes a leaking of a refrigerant from the air conditioning system. Desirably, critical design constraints of the fitting and seal structure are optimized in order to minimize an overall package size of the fitting and leaking of the refrigerant from the air conditioning system.

SUMMARY OF THE INVENTION

In accordance and attuned with the instant disclosure, a fitting including a seal structure for use in an air conditioning system, in which the critical design constraints have been optimized to minimize an overall package size of the fitting and leaking of a refrigerant from the air conditioning system, has surprisingly been discovered.

According to another embodiment of the disclosure, a block fitting and seal structure for an air conditioning systems disclosed. The structure includes a male block fitting adapted to be received in a female block component of the air conditioning system. The male block fitting including an axially extending protuberant portion. An annular seal is disposed about the protuberant portion. The seal is configured to cooperate with the male block fitting and the female block component to provide an axial seal and a radial seal between the male block fitting and the female block component.

According to another embodiment of the disclosure, a block fitting and seal structure for an air conditioning systems disclosed. The structure includes a female block fitting adapted to be received in a male block component of the air conditioning system. The female block fitting includes a recessed portion for engaging a protuberant portion of the male block component. An annular seal is disposed within the recessed portion. The seal is configured to cooperate with the female block fitting and the male block component to provide an axial seal and a radial seal between the female block fitting and the male block component.

According to yet another embodiment, a block fitting and seal structure for an air conditioning system includes a male block fitting and a female block fitting. The male block fitting includes an axially extending protuberant portion. A distal end of the protuberant portion has a tapered portion formed thereon. A female block fitting includes a recessed portion with a tapered portion formed therein. The tapered portion of the female block fitting is configured to engage the tapered portion of the male block fitting. An annular seal is disposed between the male block fitting and the female block fitting. The seal provides an axial seal and a radial seal between the male block fitting and the female block fitting.

DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the order of the steps presented is exemplary in nature, and thus, is not necessary or critical.

A" and "an" as used herein indicate "at least one" of the item is present; a plurality of such items may be present, when possible. As used herein, "substantially" means "to a considerable degree," "largely," or "proximately" as a person skilled in the art in view of the instant disclosure would understand the term. Spatially relative terms, such as "front," "back," "inner," "outer," "bottom," "top," "horizontal," "vertical," "upper," "lower," "side," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
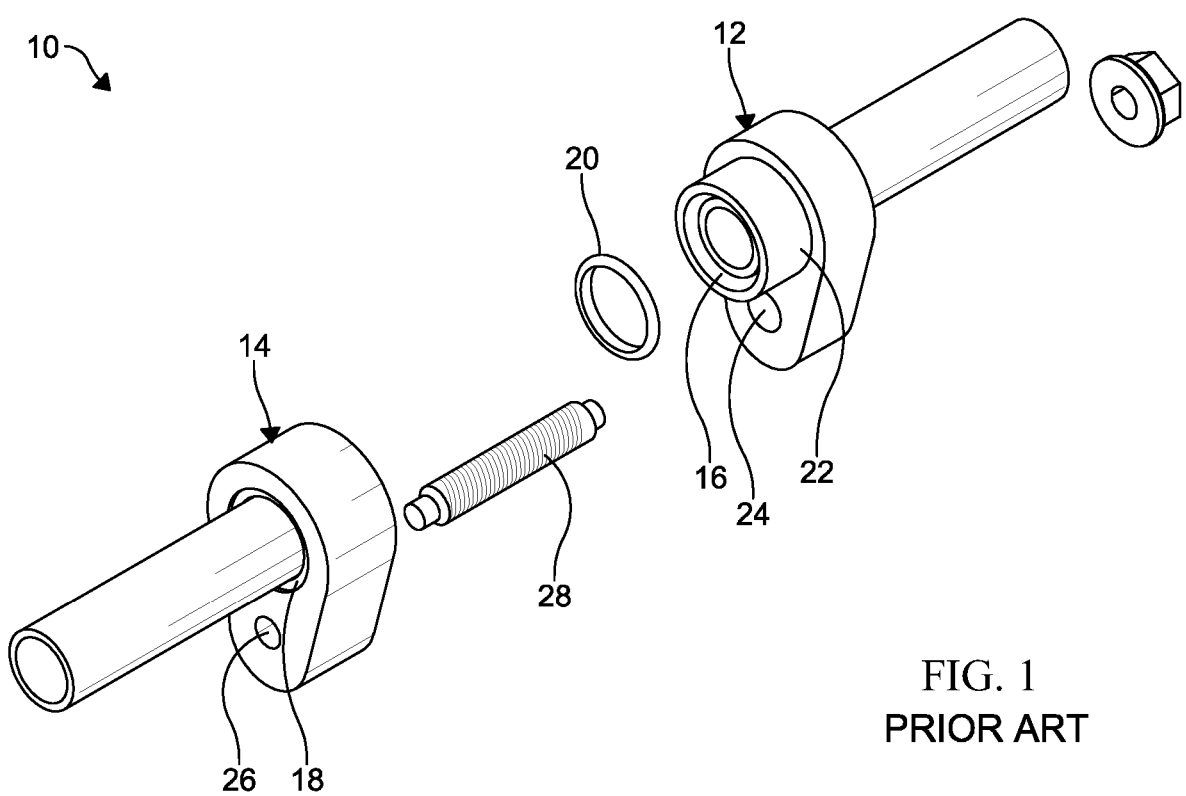
FIG. 1 is an exploded front perspective view of a block fitting and seal structure according to a first example of prior art.
Figure 2:
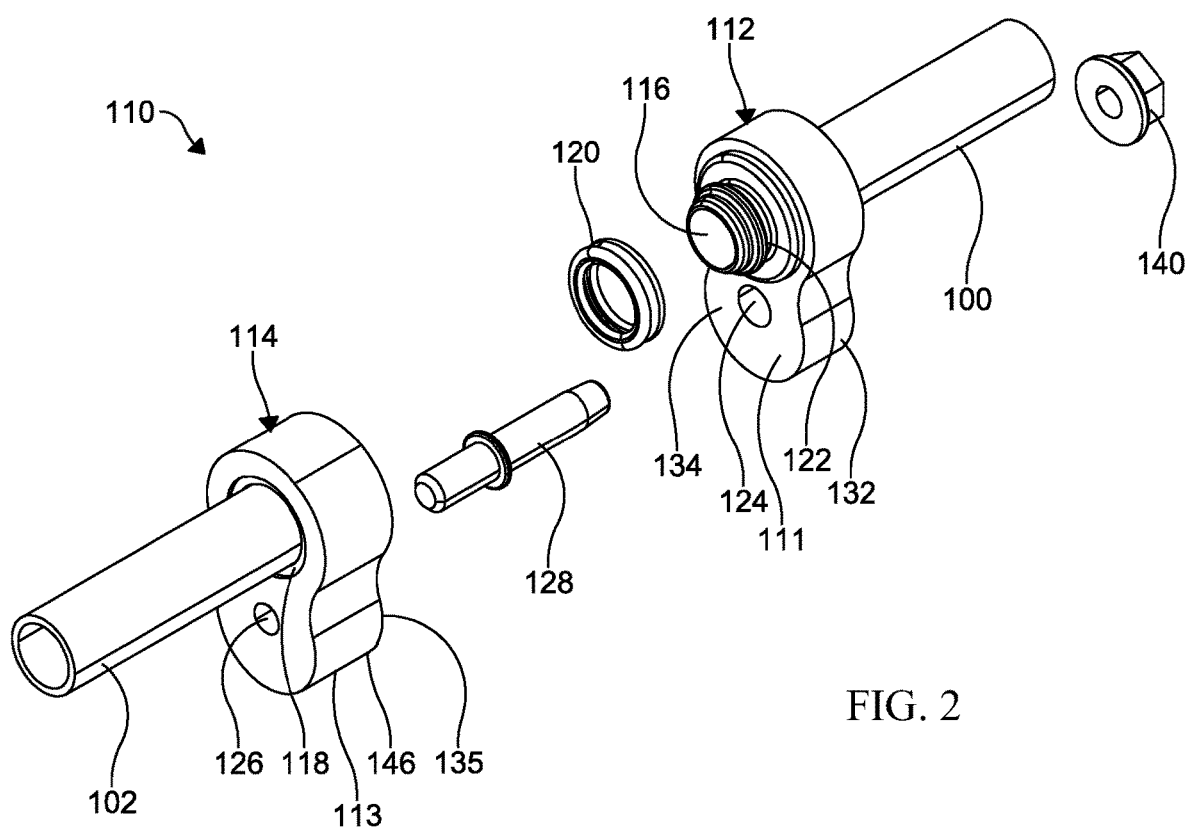
FIG. 2 is an exploded front perspective view of a block fitting and seal structure according to an embodiment of the disclosure.
Figure 3:
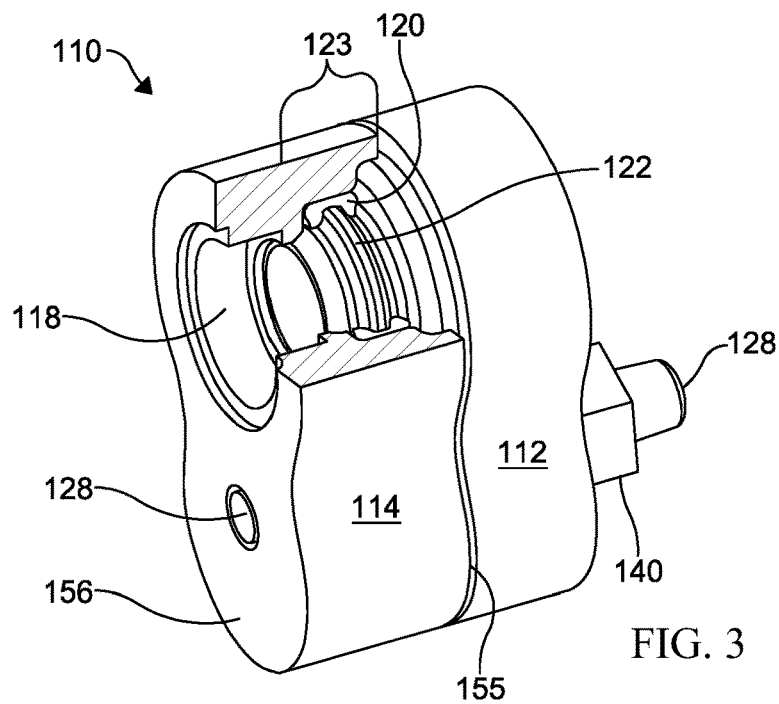
FIG. 3 is an assembled front perspective view of the block fitting and seal structure of FIG. 2 with a portion of a female block fitting removed.
Figure 4:
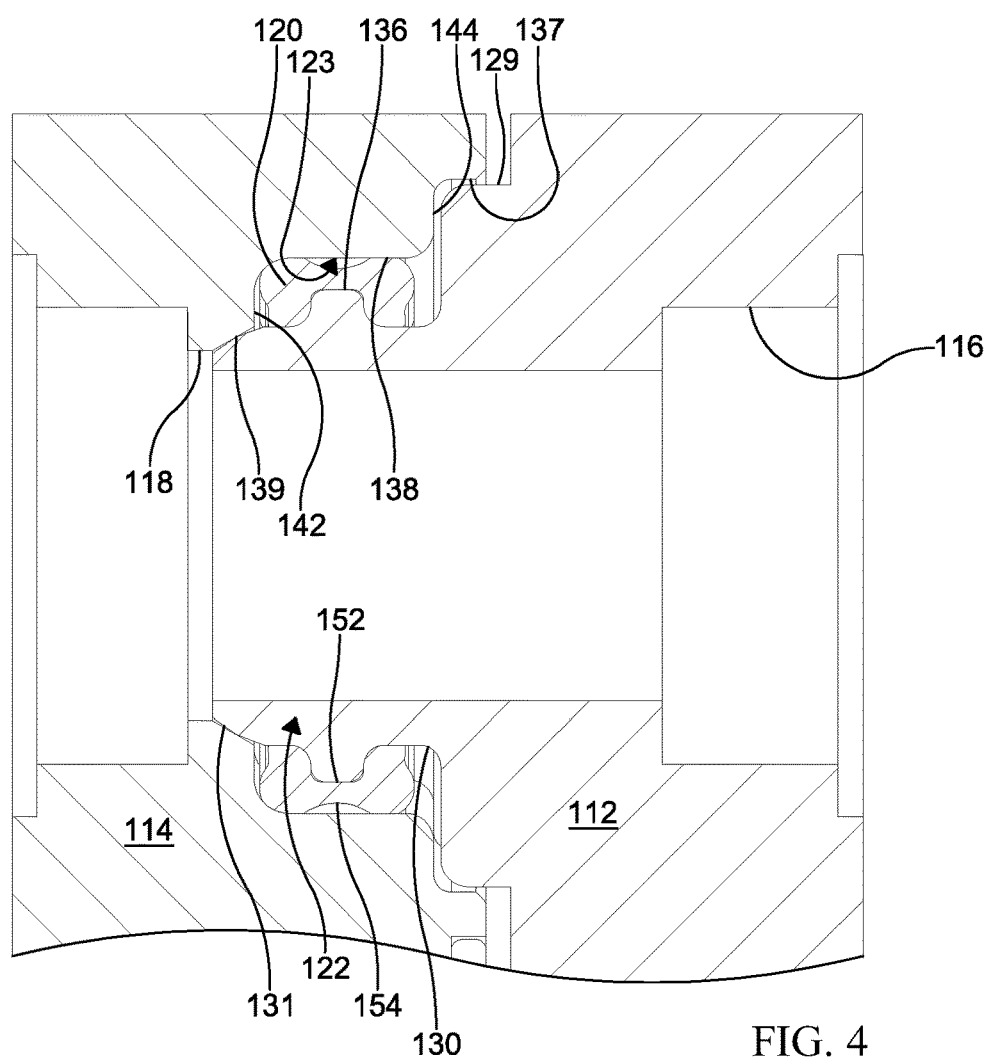
FIG. 4 is an enlarged fragmentary cross-sectional elevational view of an upper portion of the block fitting and seal structure of FIGS. 2-3 showing a protuberant portion of a male block fitting received in a recessed portion of a female block fitting and a seal disposed intermediate the male block fitting and the female block fitting.

FIGS. 2-4 illustrate a block fitting and seal structure 110 according to an embodiment of the invention. The structure is configured to receive an end of a first tube 100 and a second tube 102 therein to substantially axially align the tubes 100, 102. The structure 110 includes a male block component or a male block fitting 112 and a female block component or a female block fitting 114. As illustrated, the block fittings 112, 114 are illustrated as a block fitting separate from a component or system. However, according to an alternate embodiment, the block fittings 112, 114 can each be configured as a component such as a component block integrated with a system or integrated with a system structure. For example, the component can be a refrigerant system component such as a condenser block or compressor manifold. In other examples, the component can be a housing or other similar structure of a system. According to the alternate embodiment, the male block fitting 112 is a block fitting configured for coupling to the female block component 114 configured as a female block component of a system or a system structure. Similarly, the male block component 112 is a male block component of a system or a system structure is configured for coupling to the female block fitting 112 configured as a block fitting.

The male block fitting 112 includes a main body 111 having a substantially peanut shape and with a tubular protuberant portion 122 configured to be received by a recessed portion 123 formed in the female block fitting 114. The main body 111 of the male block fitting 112 and the protuberant portion 122 include a first aperture 116 formed therethrough. At least a portion of the first aperture 116 is configured to receive an end of the first tube 100. A second aperture 124 is formed through the main body 111 of the male block fitting 112 to receive a fastener 128 therein. The second aperture 124 is formed through a lower body portion 132 of the male block fitting 112. A portion of the body 111 surrounding the first aperture 116 and the second aperture 124 of the male block fitting 112 is herein referred to as a flanged portion 134 of the male block fitting 112. Where the male block fitting 112 is configured as a male block component of a system or structure, the body 111 is formed as a portion of the system or structure.

The protuberant portion 122 is annular and is divided into three continuous segments: a first segment 129 having a substantially constant outer diameter, a second segment 130 having a substantially constant outer diameter less than the diameter of the first segment 129, and a third segment or tapered portion 131. A distal end of the protuberant portion 122 includes the tapered portion 131 tapering at a variable angle. Although, it is understood the tapered portion 131 can taper at a constant angle, if desired. The tapered portion 131 tapers at an acute angle with respect to a longitudinal axis of the first aperture 116. The second segment 130 is formed intermediate the tapered portion 131 and the first segment 129. An annular protuberance 136 is formed on the second segment 130 intermediate a first end and a second end thereof. The annular protuberance 136 extends radially outwardly from an outer surface of the second segment 130 and has a substantially constant outer diameter.

The female block fitting 114 includes a main body 113 having a substantially peanut shape with the recessed portion 123 formed therein configured to receive the protuberant portion 122 of the male block fitting 112. A first aperture 118 is formed through the female block fitting 114 and is concentric with and coextensive with the recessed portion 123. The first aperture 118 of the female block fitting 114 aligns with the first aperture 116 of the male block fitting 112 and is configured to receive an end of the second tube 102. A second aperture 126 is formed through the main body 113 of the female block fitting 114 to receive the fastener 128 therein. The fastener 128 couples the male block fitting 112 to the female block fitting 114. The second aperture 126 of the female block fitting 114 aligns with the second aperture 124 of the male block fitting 112. In certain embodiments, the fastener 128 is threaded and engages threads formed within the second apertures 124, 126. In other embodiments, the fastener 128 can be configured as a pin, anchor, or bolt. The second aperture 126 is formed through a lower body portion 146 of the female block fitting 114. A portion of the main body 113 surrounding the first aperture 118 and the second aperture 126 of the female block fitting 114 is herein collectively referred to as a flanged portion 135 of the female block fitting 114. Where the female block fitting 114 is configured as a female block component of a system or structure, the body 113 is formed as a portion of the system or structure.

A cross-sectional shape or inner contour of the recessed portion 123 substantially corresponds to a cross-sectional shape or outer contour of the protuberant portion 122 of the male block fitting 112. The recessed portion 123 is divided into three continuous portions: a first segment 137 adjacent an inner surface 155 of the body 113 having a substantially constant diameter, a second segment 138 having a substantially constant diameter less than the diameter of the first segment 137, and a third segment or a tapered portion 139. The tapered portion 139 of the female block fitting 114 is adjacent to the aperture 118 of the female block fitting 114 extending from an outer surface 156 of the female block fitting 114 to the tapered portion 139. The tapered portion 139 of the recessed portion 123 has a diameter less than the diameter of the second segment 138 of the recessed portion 123 along a length thereof. The tapered portion 139 of the female block fitting 114 is configured to receive and engage the tapered portion 131 of the male block fitting 112. The second segment 138 is disposed intermediate the tapered portion 139 and the first segment 137. The second segment 138 of the female block fitting 114 is configured to receive the second segment 130 of the male block fitting 112. The tapered portion 139 of the female block fitting 114 is configured to receive the tapered portion 131 of the male block fitting 112. The tapered portions 139 of the female block fitting 114, which is formed from a metal, engages the tapered portion 131 of the male block fitting 112, which is formed from metal, to form a seal such as a metal-to-metal seal. However, it is understood, the tapered portions 131, 139 can be formed from other material, if desired.

The tapered portion 139 of the female block fitting 114, with or without a variable angle, is tapered at an acute angle with respect to a longitudinal axis of the first aperture 118 of the female block fitting 114. A first shoulder 142 is formed intermediate the tapered portion 139 of the recessed portion 123 and the second segment 138 of the recessed portion 123. A second shoulder 144 is formed intermediate the second segment 138 of the recessed portion 123 and the first segment 137 of the recessed portion 123 to act as a stop for the first segment 129 of the male block fitting 112.

An annular seal 120 is configured to be received between the protuberant portion 122 of the male block fitting 112 and the recessed portion 123 of the female block fitting 114. In the embodiment shown, the seal 120 is configured to substantially surround the annular protuberance 136 of the second segment 130 of the protuberant portion 122 of the male block fitting 112 and abut an internal surface of the second segment 138 of the recessed portion 123 of the female block fitting 114. In the embodiment shown, the seal 120 is formed from an elastomeric material. However, it is understood the seal 120 maybe formed from other materials having desired characteristics such as deformability and chemical resistance. The first shoulder 142 acts as a stop for the seal 120 to militate against axial movement of the seal 120.

Figure 5:
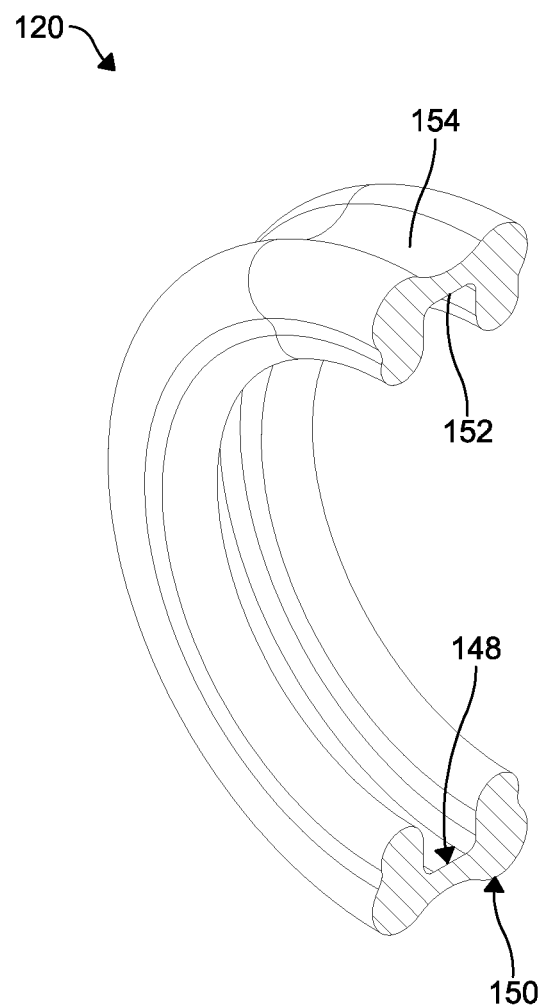
FIG. 5 is an enlarged fragmentary front perspective view of the seal of the fitting and seal structure illustrated in FIGS. 2-4.

As shown in FIGS. 4-5, the seal 120 has a substantially U-shaped cross-section with an inner surface 148 and an outer surface 150. However, it is understood other cross-sectional shapes can be used as desired. The inner surface 148 of the seal 120 includes a recess 152 generally corresponding in shape to the annular protuberance 136 of the second segment 130 of the protuberant portion 122 of the male block fitting 112. In the embodiment illustrated, the recess 152 has a substantially rectangular cross-sectional shape. However, other shapes of the recess 152 can be contemplated as desired. The outer surface 150 of the seal 120 includes a substantially arcuate concave depression 154 formed therein. The depression 154 permits the seal 120 to deflect or bend while minimizing fracture or damage to the seal 120. The seal 120 has a length substantially equal to a length of the second segments 130, 138 of the protuberant portion 122 and the recessed portion 123, respectively.

Figure 6:
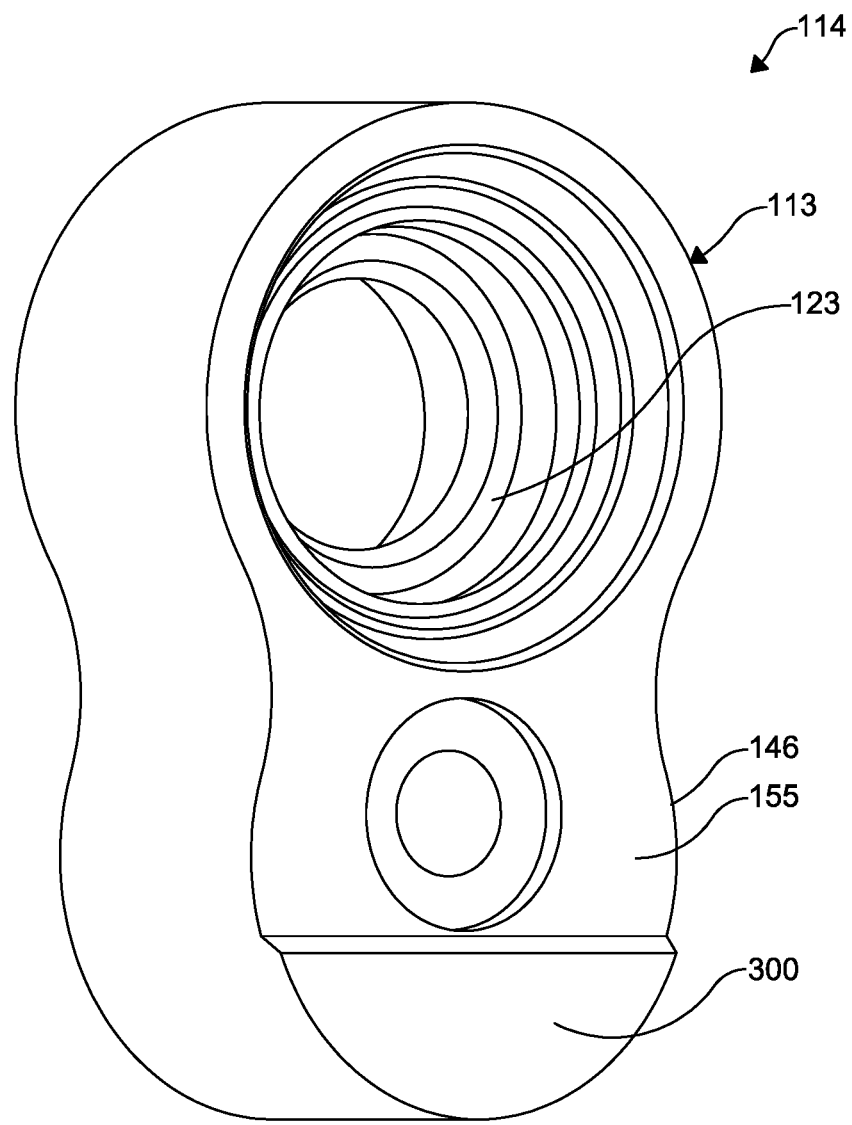
FIG. 6 is a right side perspective view of a female block fitting according to another embodiment of the disclosure.

As shown in FIG. 6, in an alternate embodiment, the female block fitting 114 includes a heel or an offset surface 300 provided on the female block fitting to improve a fitting guidance during tightening of the block fittings 112, 114 or facilitate a substantially uniform assembly force. The offset surface 300 extends outwardly from the inner surface 155 of the lower body portion 146. The offset surface 300 is formed at a bottom of the lower body portion 146. Although, it is understood the offset surface 300 can be formed at other portions of the lower body portion 146, if desired. It is understood the heel or the offset surface 300 can also be provided on the male block fitting 112, if desired.

To assemble, the seal 120 is positioned on the annular protuberance 136 with the recess 152 receiving the annular protuberance 136 therein. The protuberant portion 122 of the male block fitting 112 is fitted into the recessed portion 123 of the female block portion 114 until the tapered portion 131 of the male block fitting 112 abuts the tapered portion 139 of the female block portion 114 to form a taper saddle. The seal 120 also abuts the first shoulder 142 of the female block fitting 114 to create a radial seal. The seal 120 is compressed between the annular protuberance 136 of the male block fitting 112 and the internal surface of the recessed portion 123 of the female block fitting 114 to create an axial seal. Furthermore, the inner surface 148 of the seal 120 substantially corresponds to the shape of the annular protuberance 136, whereby the seal 120 substantially surrounds and fits around the annular protuberance 136 to form a primary seal. The surrounding of the annular protuberance 136 by the seal 120 forms both an axial seal and a radial seal, thereby maximizing a sealing of the male block fitting 112 and the female block fitting 114. In addition, the taper saddle formed between the tapered portion 131 of the male block fitting 112 and the tapered portion 139 of the female block fitting 114 also functions as a sealing surface between the female block fitting 114 and the male block fitting 112 to form a secondary seal. It is understood either a variable angle or constant angle can be used on the tapered portions 131, 139 on one or both of the male block fitting 112 and the female block fitting 114 without departing from the scope of the invention. The fastener 128 extends through the second apertures 124, 126 of the male block fitting 112 and the female block fitting 114 to couple the male block fitting 112 to the female block fitting 114. A fastening nut 140 is used to secure the fastener 128 in position. The first tube 100 is received in the male block fitting 112 and the second tube 200 is received in the female block fitting 114 and is aligned with the first tube 100. The tubes 100, 200 can be received in the respective fittings 112, 114 before or after the coupling of the fittings 112, 114 to each other.

Advantageously, the block fitting and seal structure 110 of the present disclosure results in the flanged portions 134, 135 being smaller than prior art flanged portions. Prior art seals have required use of larger fitting flanged portions (material surrounding the first and second apertures of the male block fitting and the female block fitting) due to a larger torque required to tighten a fastener used to couple the male block fitting and the female block fitting together and avoid distortion or bending of the male block fitting or the female block fitting. The larger torque was required due to the configuration and location of the seals between the male block fitting and the female block fitting. Due to the cooperation of the seal 120 of the present disclosure with the annular protuberance 136 and the internal surface of the second segment 138 of the female block portion 114 to form both the axial seal and the radial seal, a smaller torque is required to tighten the fastener 128 coupling the female block fitting 114 and the male block fitting 112 together. Thus, a smaller flange portion is required in the female block fitting 114 and the male block fitting 112. As a result, areas of reduced material or thinner material can be utilized for the female block fitting 114 and the male block fitting 112 to minimize a package size within a vehicle and minimize a weight of the block fitting and seal structure 110.

The block fitting and seal structure 110 produced according to the constraints of the present disclosure thereby minimizes an overall package size of the block fitting and seal structure 110 and a leaking of the refrigerant from the air conditioning system including the same.

Although the embodiment shown and described is used for a block type fitting for an air conditioning system, it is understood that the seal structure 10 can be used with other fitting types as desired.

While certain representative embodiments and details have been shown for purposes of illustrating the invention, it will be apparent to those skilled in the art that various changes may be made without departing from the scope of the disclosure, which is further described in the following appended claims.

What is claimed is:

1. A block fitting and seal structure for an air conditioning system comprising:
    a male block fitting including an axially extending protuberant portion, a distal end of the protuberant portion having a tapered portion formed thereon;
    a female block fitting including a recessed portion with a tapered portion formed therein, the tapered portion of the female block fitting configured to engage the tapered portion of the male block fitting;
    a first aperture formed through each of the male block fitting and the female block fitting, wherein the first aperture of the male block fitting is formed through the protuberant portion and is configured to receive a first tube, and wherein the first aperture of the female block fitting is formed through the recessed portion and is configured to receive a second tube, wherein the recessed portion is divided into a first segment having a first internal diameter, a second segment having a second internal diameter less than the first internal diameter, and a third segment including the tapered portion of the female block fitting, wherein the protuberant portion is divided into a first segment having a first outer diameter, a second segment having a second outer diameter less than the first outer diameter, and a third segment having an outer diameter less than the second outer diameter;
    an annular protuberance formed on the second segment of the protuberant portion of the male block fitting; and
    an annular seal disposed between the male block fitting and the female block fitting, the seal engaging a shoulder formed on an internal surface of the recessed portion, wherein the seal is substantially u-shaped and includes an inner surface and an outer surface, wherein the inner surface of the seal has a recess formed thereon and the outer surface of the seal has arcuate depression formed thereon, wherein the annular protuberance is received in the recess of the seal.

2. The block fitting and seal structure of claim 1, further comprising a second aperture formed through each of the male block fitting and the female block fitting, each of the second apertures configured to receive a fastener therein.

3. The block fitting and seal structure of claim 1, wherein the third segment of the protuberant portion includes the tapered portion of the male block fitting, and wherein the seal is received on the second segment of the protuberant portion.

4. The block fitting and seal structure of claim 3, wherein the seal engages an internal surface of the second segment of the recessed portion.

5. The block fitting and seal structure of claim 4, wherein the seal has a length equal to a length of each of the second segments of the protuberant portion of the male block fitting and the recessed portion of the female block fitting.

6. The block fitting and seal structure of claim 1, wherein the tapered portion of each of the male block fitting and the female block fitting tapers at one of a variable angle and a constant angle along a length thereof.

7. The block fitting and seal structure of claim 1, wherein one of the female block fitting and the male block fitting includes a lower body portion with an offset surface extending outwardly from an inner surface of the lower body portion.

* * * * *